Patented June 8, 1926.

1,587,537

UNITED STATES PATENT OFFICE.

CHAUNCEY C. LOOMIS, OF YONKERS, NEW YORK, ASSIGNOR TO LOOMIS, STUMP & BANKS, A PARTNERSHIP, OF NEW YORK, N. Y.

METHOD OF MAKING MOLDED RUBBER PRODUCT.

No Drawing.    Application filed May 14, 1924. Serial No. 713,251.

This invention relates to molded waste-rubber products and has among its principal objects the provision of an improved molded product of this character, having more desirable properties for many purposes than those hitherto known.

I am aware that hitherto attempts have been made to prepare useful molded products from waste-rubber by various methods.
In these old methods, however, the waste-rubber material is subjected to treatments designed to regenerate the waste-rubber and work it over into imitation rubber, or material resembling ordinary new vulcanized soft rubber as nearly as possible. I am also aware that similar attempts have hitherto been made to regenerate or reform ebonite or hard rubber scrap to produce imitation hard rubber.
The molded waste-rubber products of the present invention, while they are somewhat similar to ordinary hard rubber in their outward appearance and in certain of their physical properties, are, nevertheless, clearly distinguished from the latter, and also from the regenerated or reformed, or imitation rubber products referred to above.

The improved molded product of the present invention may be cut, sawed or otherwise machined about as readily as ordinary hard rubber, although in this respect, the new product in some of its forms more nearly resembles certain varieties of wood than it does ordinary hard rubber.
The product of the present invention in practically all its forms also possesses certain other desirable properties which still more clearly characterize and distinguish it from the older products referred to above and among these characterizing properties mention may here be made of its non-resilient character and greater rigidity as compared to ordinary soft rubbers on the one hand, and its greater resistance to mechanical shock as compared to the ordinary varieties of hard rubber or ebonite on the other hand.

The new product is further characterized in a great many of its forms by a porous or granular structure, which, it is believed, contributes to the above-mentioned resistance to mechanical shock and which also permits it to be impregnated with molten resin and the like, whereby a wide variety of still other new and useful products can be obtained having highly advantageous properties for a great variety of uses.

The present invention also comprises novel and convenient methods for making the above mentioned new products. These methods are easily and conveniently applied in practice and involve the use of apparatus and equipment of the simplest character as compared with the apparatus and equipment commonly employed in the manufacture of ordinary or standard rubber products from raw rubber or from various mixes containing raw rubber.

The various novel features and advantages of my invention will appear more clearly and fully from the following examples which illustrate various embodiments of my invention both as to process and product.

*Example 1.*

In the practice of my invention, I may take, for example, 100 parts of finely comminuted vulcanized rubber such as automobile tire scrap (obtained from casings or inner tubes alone or from both, or from like sources) and to this comminuted waste material I may add 10 parts by weight of ordinary ground sulphur, mixing the ingredients together thoroughly. The mixture thus obtained is then formed into the desired shape by the aid of heat and pressure, preferably by employing steam heated molds and compressing at about 100 to 1,000 pounds per square inch at a temperature of from about 100° C. to 160° C. The time required for molding and forming depends upon the thickness of the article to be made, but sufficient time should be allowed to permit uniform heating of the material throughout its mass. The pressure is then released and the article removed from the mold. At this stage the molded article has considerable mechanical strength, and therefore, requires no special methods for handling. At this stage also the product somewhat resembles so-called 'reformed rubber' prepared by the older processes referred to above.

The molded material is now placed in any ordinary hot air oven and baked at a temperature of from about 130° C. to about 250° C. or higher but preferably around 180° C. and is kept in the oven until the desired hardness, after cooling, is obtained. When prepared in this manner the hardness (after cooling) will vary with the time of heating and the temperature of the baking oven, the lower the temperature the longer the time of heating required to produce a given degree of hardness. After the baking operation the article is allowed to cool and is then ready for use or finishing. While, as just stated, the hardness varies somewhat according to the temperature and time of baking, I prefer to continue the hardening or baking operation until the product obtained possesses, after cooling to ordinary temperature, a hardness comparable to that of seasoned hard wood and a resistance to mechanical shock greater than that of ordinary ebonite.

A block 4 inches by 6 inches by 1½ inches thick formed as above specified and baked at a temperature of from about 130° C. to about 180° C. as aforesaid for a period of from about 20 minutes to two hours, and then cooled to ordinary temperature does not break or shatter when subjected to severe mechanical shocks such as may be produced for example in the following manner: —The block is placed flat upon a smooth anvil and struck with an ordinary 10 pound sledge hammer wielded with a complete swing by a man of ordinary size and strength and with approximately his full strength, the blow being struck with the full flat surface (approximately 3 square inches) of the head of the sledge which has a handle approximately 2½ feet long.

Example 2.

Proceed as in example 1 omitting the addition of the sulphur, but bake the article after the molding or forming operation for a considerably longer period of time than that employed in example 1 continuing the baking until the desired hardness is obtained. The comminuted waste-rubber for this example should be ordinary vulcanized soft rubber scrap but need not be of any particular grade or quality.

Example 3.

The finished product obtained either from example 1 or example 2 after baking is impregnated with cumaron resin or similar high melting, non-volatile dielectric material by melting the cumaron resin and immersing the hardened product therein. The time of immersion may be varied according to the degree of penetration desired. The longer the time the greater the penetration of the resin into the body of the article. After the desired impregnation has been obtained the article is removed and allowed to cool in order to solidify the resin in the pores of the formed and hardened article. The product thus obtained has substantially all the desirable properties of the molded and hardened waste product and in addition it possesses also high electrical resistance sufficient to adapt it to be used for electrical insulation and particularly under conditions where it is desired to reduce the surface leakage of electrical current to a minimum. The product of this example also possesses many other desirable electric and dielectric properties.

Example 4.

After forming the article as in example 1 and before baking, immerse the formed article in molten liquid sulphur until the sulphur penetrates to the desired depth into the body of the article, then remove from the molten sulphur and bake as in example 1 or 2 until the desired degree of surface hardness is obtained. The product thus formed may be said to be case-hardened in the sense that the finished article has an outer shell which is harder than its interior portion. This case-hardened product will withstand severe mechanical shocks of the character described in connection with example 1 and in addition it exhibits even greater transverse breaking strength than an article prepared in a similar manner but which is not case-hardened and which has substantially the same hardness throughout its mass. This greater resistance to transverse breaking stresses is due, I believe, to some sort of cushioning effect of the more porous interior portions of the article.

It will be understood, of course, that my invention is not restricted to the particular details set forth in the foregoing examples but that I may make various changes both as to the ingredients employed and the method of combining and treating the same without departing from the true scope of my invention as set forth in the appended claims.

Thus for instance, in example 3, I may substitute for the molten cumaron resin other similar liquids such for example as a solution of bakelite or molten wax, or molten bitumin and the like. Also in the preparation of case-hardened articles in accordance with my invention after the molding step of my process I may effect substantially the same result with respect to case hardening by subjecting the formed article to a relatively high temperature for a relatively short period of time in the baking operation so as to produce the case-hardening or formation of a hardened outer shell by localizing the high temperature in the surface layers or periphery of the article.

During the formation of the improved product of the present invention, as for example, during the process described in example 1 above, a considerable amount of volatile material is evolved, including copious amounts of hydrogen sulfide gas and including also a liquid distillate corresponding to about two to three percent by weight of the material treated and consisting of about fifty percent by weight of water and about fifty percent by weight of an oily product.

I have found also that the hardening of the molded product in accordance with my invention may be carried out by immersing the formed article in glycerine or molten cumaron or like inert high-boiling liquid and subjecting the formed article to the action of heat in the presence of a vulcanizing agent such as sulfur or oxygen and under such conditions that the volatile products can escape through the liquid.

The product thus obtained while possessing substantially all the desirable characteristics hereinbefore mentioned is, however, not so suitable for certain purposes as the product produced by baking in air, and for this reason I prefer the latter process and the product resulting therefrom.

It will be noted also that in the production of my improved product as described in the foregoing examples, the waste-rubber is subjected to the action of heat in the presence of ordinary air, and a certain amount of oxidation occurs which contributes, I believe, to the formation of my improved product. As evidence of this I have found that if the second step of my process is carried out with the exclusion of air and added sulphur but otherwise as described in example 1, the resultant product does not possess the desirable properties of my improved product, but is a product having substantially different properties. The effect of the oxidation at the higher temperature in the second step of my process is, I believe, to bring about a vulcanizing action upon the comminuted and molded waste-rubber material, this vulcanization being naturally of a somewhat different character from that produced by sulphur under the conditions of the ordinary processes of vulcanization. Simultaneously, with this oxidizing action, the added sulphur, when this is employed, also contributes to the vulcanizing and hardening of the final product.

It will be understood, however, that the vulcanizing action which occurs in the second step of my process does not progress or take place uniformly throughout the mass of the individual particles of the comminuted waste-rubber. In fact, I have found that this vulcanization appears to take place to a greater degree in the superficial layers of the individual particles of the comminuted rubber and around the edges thereof in such manner as to bind or cement the particles together at their points of contact and in this manner forming a coarse network of the particles, resulting in the porous structure which is characteristic of my improved rubber product and which I believe gives rise to many of the desirable properties already referred to.

I have found that my improved product is particularly adapted for the production of molded golf club heads, golf balls, tool handles for heavy work such as shovel handles, and similar articles, and my invention therefore, includes these molded products as new articles of manufacture. More particularly, my invention includes golf club heads molded and hardened by the processes described in the examples, and having a substantially uniform structure throughout,—that is to say, it is not necessary in constructing such a golf club head in accordance with my invention to face the head with any resilient material or to load it with any heavy metal or the like in order to obtain a golf club head having the desired weight and driving characteristics. I have also found that a golf club thus constructed in accordance with my invention has better driving characteristics than ordinary golf club heads, enabling the golfer to obtain a substantially greater distance in driving, amounting in some instances to an additional thirty yards or more.

Among the various uses for which I have found my new product to be well adapted, mention may be made of the following: molded sink boards, toilet seats, furniture and furniture parts, automobile steering wheels, battery boxes, electrical apparatus such as panels for radio-receiving sets, loud speakers, switch boards and insulating material in general, acid pipes, containers, valves, etc., for handling corrosive liquids, frames and plates for filter presses and many similar articles, gears, pulleys and similar mechanical devices, musical instruments and battery spacers, and a great variety of other useful articles and products.

In the molding step of my process prior to baking and hardening the molded article, I have found it advantageous to employ iron molds in preference to certain other metals to which latter the molded product frequently sticks or adheres to an objectionable extent. Also, I have found it advantageous to cover the surface of the molds with graphite, bentonite clay or similar inert solid lubricating material. Such lubrication of the mold, will ordinarily prevent the sticking of the article to the surface of the mold for a considerable number of molding operations, so that it is not necessary to lubricate the mold each time that it is used.

I claim:

1. The method of preparing a molded vulcanized rubber product which comprises comminuting vulcanized rubber, forming the comminuated rubber into any desired shape by means of heat and pressure, and hardening the molded product by means of heat in the presence of an atmosphere containing oxygen.

2. The method of preparing a molded vulcanized rubber product which comprises comminuting vulcanized rubber, mixing the comminuted rubber with sulphur, forming the comminuted rubber and sulphur into any desired shape and hardening the molded article thus obtained by heating it at a temperature above about 120° C. under such conditions as to permit the escape of volatile decomposition products.

3. The method of preparing a molded vulcanized rubber product which comprises comminuting vulcanized rubber, forming the comminuted rubber into any desired shape and hardening the molded article thus obtained by heating it at a temperature above about 120° C. until the desired hardness is obtained, the hardening operation being conducted in an atmosphere containing oxygen.

4. The method of preparing a molded vulcanized rubber product which comprises comminuting vulcanized waste rubber, forming the comminuted rubber into any desired shape by subjecting it to a pressure in a mold at a temperature above about 100° C. and hardening the product thus obtained by subjecting it to the action of an oxygen containing atmosphere at a temperature above about 120° C. until the desired hardness is obtained.

5. The method of preparing a molded vulcanized rubber product which comprises molding a mixture of comminuted vulcanized rubber and sulfur into any desired shape under the action of heat and pressure, then hardening the molded article thus produced by subjecting it to the action of an oxygen containing atmosphere at a temperature of from about 120° C. to about 250° C. until the desired hardness is obtained.

6. The method of preparing a molded vulcanized rubber product which comprises comminuting vulcanized waste rubber, mixing sulfur therewith, forming the mixture of sulfur and comminuted rubber into any desired shape by subjecting it to the action of heat and pressure in a mold and hardening the molded product by subjecting it to the action of heat in the presence of an oxygen containing atmosphere until the desired hardness is obtained.

7. The method of preparing a molded vulcanized rubber product which comprises comminuting vulcanized rubber, forming the comminuted vulcanized rubber into any desired shape by means of heat and pressure and hardening the molded product thus obtained by the application of heat under such conditions as to permit the escape of volatile products.

8. The method of preparing a molded vulcanized rubber product which comprises comminuting vulcanized rubber molding into any desired shape and hardening the molded product thus obtained by subjecting it to the action of heat under such conditions as to permit the escape of volatile products, the hardening operation by heating being carried out in the presence of a vulcanizing agent.

In testimony whereof I affix my signature.

CHAUNCEY C. LOOMIS.